United States Patent [19]

Brown et al.

[11] 4,453,156

[45] Jun. 5, 1984

[54] LOAD CONTROL RECEIVER AND METHOD OF OPERATION

[75] Inventors: Richard W. Brown, Mound; Gary Winkler, Minneapolis, both of Minn.

[73] Assignee: Brown, Boveri & Co. AG, Mannheim-Käfertal, Fed. Rep. of Germany

[21] Appl. No.: 329,669

[22] Filed: Dec. 11, 1981

[51] Int. Cl.$^3$ ........................ H04B 3/54; G08C 19/00
[52] U.S. Cl. ............................ 340/310 R; 340/825.7; 340/825.64; 340/310 A; 375/94; 375/95
[58] Field of Search .......... 340/310 R, 310 A, 825.77, 340/825.58, 825.64, 825.7; 329/135, 146; 375/94, 95

[56] References Cited

U.S. PATENT DOCUMENTS

| | | | |
|---|---|---|---|
| 4,091,361 | 5/1978 | Eichelberger et al. | 340/310 R |
| 4,106,007 | 8/1978 | Johnston et al. | 340/310 A |
| 4,370,563 | 1/1983 | Vandling | 340/310 A |
| 4,379,284 | 4/1983 | Boykin | 340/310 R |
| 4,399,547 | 8/1983 | Moore et al. | 375/94 |

Primary Examiner—James J. Groody
Attorney, Agent, or Firm—Herbert L. Lerner; Laurence A. Greenberg

[57] ABSTRACT

Method for detecting the presence or absence of an audio-frequency signal ($V_T$) superimposed on a power supply network, the audio-frequency signal ($V_T$) having a known frequency ($f_T$) and an amplitude ($A_T$) lying within a permissible range of amplitudes ($\Delta A_T$), where the power supply network transmits a signal mixture (V) containing a fundamental ($V_g$, $f_g$, $A_g$), harmonic frequencies ($V_H$, $f_H$, $A_H$) thereof and interference frequencies ($V_S$, $f_S$, $A_S$), which includes, with a microcomputer ($M_C$), generating a signal at the same point on adjacent waves of the fundamental ($V_g$);

after the occurrence of a first generated signal (ZCS 1), taking with an A/D-converter (ADC), at equal time intervals ($\Delta t$), a given number (N) of samples (S0) of the voltage (V) on the power supply network, and storing the digital amplitude widths thereof (S0.1, S0.2, ... S0.N) in a read-write memory (RAM);

after the occurrence of a further generated signal (ZCS 2), taking a further equal number (N) of samples (S1);

forming a digital difference (D) of respective amplitude values (S0.1, S1.1) of the two samples (S0, S1);

likewise storing the digital difference values (D1, ... DN);

as a first criterion, checking the digital difference values (D1 ... DN) as to whether they are within a range of difference values ($\Delta D$) which corresponds to the permissible range of amplitudes ($\Delta A_T$) of the audio-frequency signal ($V_T$);

determining minimum values ($D_{min}$) of the digital difference values (D1 ... DN);

determining a spacing difference ($\Delta N$) between two successive minima ($D_{min}$);

as a second criterion, checking the spacing difference ($\Delta N$) as to whether it corresponds to the spacing of two successive points of the audio-frequency signal ($V_T$) at which the generated signal is generated; and generating a "present" signal (ES) in the microcomputer when both criteria are met.

24 Claims, 16 Drawing Figures

Fig.7
LOAD GROUP 2-OFF: BIT PATTERN 2-5-9
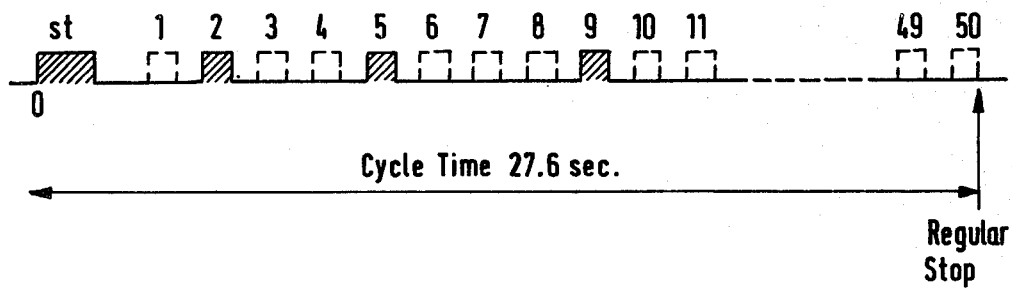
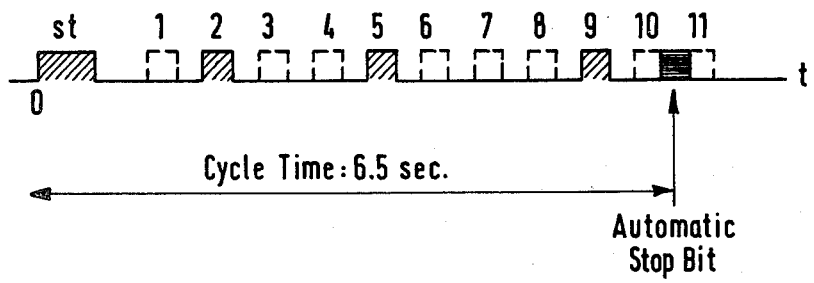

LOAD CONTROL RECEIVER AND METHOD OF OPERATION

The invention relates to a load control receiver and method of operation thereof. For influencing or controlling consumers of electric energy (load management), low-frequency carrier methods have been employed as proven methods for many years.

In such methods, the electrical power supply networks are super-imposed by audio-frequency control signals in the form of standardized formats which are evaluated by receivers and, upon concurrence or coincidence, are converted into switching actions.

Since this type of control system is a mass control method wherein many recievers are controlled simultaneously from a central location, the efficiency of such systems is determined decisively by the expense on the receiver side.

Receiver building blocks of heretofore known conception are formed primarily of the following functional groups:

a filter module for selecting the carrier frequency, a decoder for evaluating the command information content, and a relay control unit for converting the command into switching commands.

The filter modules must be subjected to laborious testing and tuning operations by tuning the filter circuits to different control frequencies.

It is an object of the invention, by means of a novel combing technique, to evaluate digitally the relatively low carrier frequency which is superimposed on the power network and to provide for the combing or detector modules and the decoder part to be realized by a single component, a microprocessor.

It is another object of the invention to provide such a load control receiver which obviates additional filter tuning work so that the manufacturing expense can be reduced greatly. By making the manufacturing process more efficient in this manner, the quality and reliability of the equipment can be improved decisively. This becomes very apparent especially in view of the service life of more than ten years which is required by electric power utilities.

Due to the higher reliability of the receiver, the quality of the supply of electric energy to the ultimate consumer is furthermore distinctly improved.

Problems of analog filters (active and passive) which are presently used instead of the digital detecting technique of the invention result mainly from the limited quality factor of these filters for this application. This means that the signal frequency is recognized from the mixture of the nominal network frequency and the even and odd harmonics thereof only if it has a relatively high value and is present for a relatively long time. Through the digital detecting technique according to the invention, the value of the required voltage can be reduced and, therefore, considerable energy can be saved on the signal generation side.

The decisive difference resulting from the digital detector according to the invention over the filters of conventional design is that the influence of harmonics on the receiver decoder part is completely i.e. 100% eliminated, in the ideal case. This will be of extreme importance in the future especially in view of the increasing loading of the power supply networks with harmonics, such as is caused by frequency-controlled drive systems, d-c transmission systems and television sets.

The thereby achieved reduction of the dependence of the receivers on constant and short-term variable network parameters ensures an additional increase in the reliability of supplying the ultimate consumer with electric energy.

The new digital detecting technique further ensures a much more exact examination of the actually transmitted bit combination. This, in turn, permits so-called "break-off" or automatic stopping of the reception after the last information-relevant bit due to a separate reset bit. After recognizing the special "break-off" signal, the receivers are reset automatically. They are then immediately in a position again to execute a new switching program. For an electric-power utility using the system of the invention, this provides an extremely reliable, flexible and fast control system for reducing an electric peak load and for optimizing the use of electric energy. Disturbances such as a continuous or maintained signal, lightning and switching surge voltages, therefore, do not, in any case, result in unintended switching actions.

It is accordingly an object of the invention to provide a method for detecting the presence or absence of an audio-frequency signal ($V_T$) superimposed on a power supply network, the audio-frequency signal ($V_T$) having a known frequency ($f_T$) and an amplitude ($A_T$) lying within a permissible range of amplitudes ($\Delta A_T$), where the power supply network transmits a signal mixture (V) containing a fundamental ($V_g$, $f_g$, $A_g$), harmonic frequencies ($V_H$, $f_H$, $A_H$) thereof and interference frequencies ($V_S$, $f_S$, $A_S$), which comprises, with a microcomputer ($M_C$), generating a signal at the same point on adjacent waves of the fundamental ($V_g$);

after the occurrence of a first generated signal (ZCS 1), taking with an A/D-converter (ADC), at equal time intervals ($\Delta t$), a given number (N) of samples (S0) of the voltage (V) on the power supply network, and storing the digital amplitude widths thereof (S0.1, S0.2, . . . S0.N) in a read-write memory (RAM);

after the occurrence of a further generated signal (ZCS 2), taking a further equal number (N) of samples (S1);

forming a digital difference (D) of respective amplitude values (S0.1.S1.1) of the two samples (S0, S1);

likewise storing the digital difference values (D1, . . . DN);

as a first criterion, checking the digital difference values (D1 . . . DN) as to whether they are within a range of difference values ($\Delta D$) which corresponds to the permissible range of amplitudes ($\Delta A_T$) of the audio-frequency signal ($V_T$);

determining minimum values ($D_{min}$) of the digital difference values (D1 . . . DN);

determining a spacing difference ($\Delta N$) between two successive minima ($D_{min}$);

as a second criterion, checking the spacing difference ($\Delta N$) as to whether it corresponds to the spacing of two successive points of the audio-frequency signal ($V_T$) at which the generated signal is generated; and generating a "present" signal (ES) in the microcomputer when both criteria are met.

In accordance with another mode of the invention, there is provided a method wherein the generated signal is a zero crossing signal (ZCS) generated by a zero crossing detector (ZCD) at each zero crossing of the fundamental ($V_g$). In accordance with a further mode of the invention, the method includes comparing basically all of the actual samples ($S_x$) with preceding samples ($S_{x-1}$) stored in the write-read memory (RAM), actualizing the values in the write-read memory (RAM) after the comparison and clearing of the old values ($S_{x-1}$).

In accordance with an additional mode of the invention, the spacing difference ($\Delta N$) is determined over a plurality of samples as a criterion of frequency selection.

In accordance with an added mode of the invention, there is provided a method which includes taking the spacing samples (S0, S1 ... SX) only in a defined angular range ($\alpha$), referred to the period of the fundamental ($V_g$).

In accordance with yet another mode of the invention, there is provided a method which includes taking the samples (S0, S1 ... Sx) in an angular range ($\alpha$) about the amplitude maxima of the fundamental ($V_g$).

In accordance with yet a further mode of the invention, there is provided a method which includes taking the samples (S0, S1 ... SX) in an angular range ($\alpha$) of the fundamental period of 45° to 135°.

In accordance with yet an additional mode of the invention there is provided a method which includes rectifying the signal mixture (V) on the power supply network before it is fed to the A/D converter (ADC).

In accordance with yet an added mode of the invention, there is provided a method which includes reducing the amplitude ($A_g$) of the fundamental ($V_g$) before the signal mixture (V) is fed to the A/D converter (ADC).

In accordance with still another mode of the invention, there is provided a method which includes feeding only the crests of the fundamental ($V_g$) to the A/D converter (ADC).

In accordance with still a further mode of the invention, there is provided a method which includes reducing the amplitude ($A_g$) of the fundamental ($V_g$) in a frequency-selective manner.

In accordance with still an additional mode of the invention, there is provided a method which includes storing only the absolute values of the digital difference values (D1 ... DN) in the write-read memory.

In accordance with still an added mode of the invention, there is provided a method which includes, as a third criterion, checking the digital difference values (D1 ... DN) as to whether they correspond to a sine function; and generating the "present" signal (ES) in the microcomputer (MC) only if all three criteria are met.

In accordance with an alternate mode of the invention, there is provided a method which includes reconverting the digital difference values (D1 ... DN) into the analog audio-frequency signal ($V_T$) by means of a digital-analog converter (DAC).

In accordance with another aspect of the invention, there is provided a system for detecting the presence or absence of an audio-frequency signal ($V_T$) superimposed on a power supply network, the audio-frequency signal ($V_T$) having a known frequency ($f_T$) and an amplitude ($A_T$) lying within a permissible range of amplitudes ($\Delta A_T$), where the power supply network transmits a signal mixture (V) containing a fundamental ($V_g$, $f_g$, $A_g$), harmonics ($V_H$, $f_H$, $A_H$) thereof and interference frequencies ($V_S$, $f_S$, $A_S$), the improvement therein comprising a microcomputer having means operatively associated therewith for generating a signal at the same point on adjacent waves of the fundamental ($V_G$);

an analog/digital converter (ADC) for taking, at equal time intervals ($\Delta t$), after the occurrence of a first generated signal (ZCS 1), a given number (N) of samples (S0) of the voltage (V) on the power supply network, a read-write memory (RAM) connected to the converter (ADC) for storing digital amplitude widths (So.1, So.2, ... So.N) of the samples (S0) in the converter (ADC), the memory (RAM), after occurrence of a further generated signal ($ZCS_2$), being actuatable for taking a further equal number (N) of samples (S1);

means for forming a digital difference (D) of the two samples (S0, S1);

the memory (RAM) being actuatable for likewise storing the digital difference values (D1, ... DN);

means for checking a first criterion as to whether the digital difference values (D1, ... DN) are within a range of difference values ($\Delta D$) which corresponds to the permissible range of amplitudes ($\Delta A_T$) of the audio-frequency signal ($V_T$);

means for determining minimum values ($D_{min}$) of the digital difference values (D1 ... DN);

means for determining a spacing difference ($\Delta N$) between two successive minima ($D_{min}$);

means for checking a second criterion as to whether the spacing difference ($\Delta N$) corresponds to the spacing of two successive points of the audio-frequency signal ($V_T$) at which the generated signal is generated; and means for generating a "present" signal (ES) in the microcomputer when both the criteria are met.

In accordance with another feature of the invention the means for generating the signal is a zero crossing detector (ZCD), and the generated signal is a zero crossing signal (ZCS) generated at each zero crossing of the fundamental ($V_g$).

In accordance with a further feature of the invention here are provided means for comparing all further samples ($S_2$, $S_3$ ... $S_x$) with the first sample (S0) stored in the read-write memory (RAM) when the "present" signal (ES) is present.

In accordance with an additional feature of the invention, there are provided means for rectifying the signal mixture (V) on the power supply network before it is fed to the analog/digital converter (ADC).

In accordance with an added feature of the invention, there are provided means for reducing the amplitude ($A_g$) of the fundamental ($V_g$) before the signal mixture (V) is fed to the analog-digital converter (ADC).

In accordance with yet another feature of the invention, there are provided means for feeding only the crests of the fundamental ($V_g$) to the analog/digital converter (ADC).

In accordance with yet a further feature of the invention, the read-write memory (RAM) for storing the digital difference values is for storing only the absolute values thereof.

In accordance with yet an additional feature of the invention, there are provided means for checking a third criterion as to whether the digital difference values (D1, ... DN) correspond to a sine function, the "present" signal generating means being actuatable only if all three criteria are met.

In accordance with another feature of the invention, there is provided a digital/analog converter (DAC) for reconverting the digital difference values (D1, ... DN) into the analog audiofrequency signal ($V_T$).

In accordance with a concomitant feature of the invention, the method includes as a fourth criterion, checking if at least half (Y/2) of a given number (Y) of sequential samples ($S_{x-y}$, $S_{x-y+1}$ ... $S_x$) fulfill at least the first and second of the first, second and third criteria; and generating the "present" signal (ES) in the microcomputer (MC) only if the fourth criterion is fulfilled.

Other features which are considered as characteristic for the invention are set forth in the appended claims.

Although the invention is illustrated and described herein as embodied in load control receiver and method of operation, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 7 is a diagrammatic data message representative of those shown in FIG. 6 for explaining the Ricontic interruption method;

Figure 1:
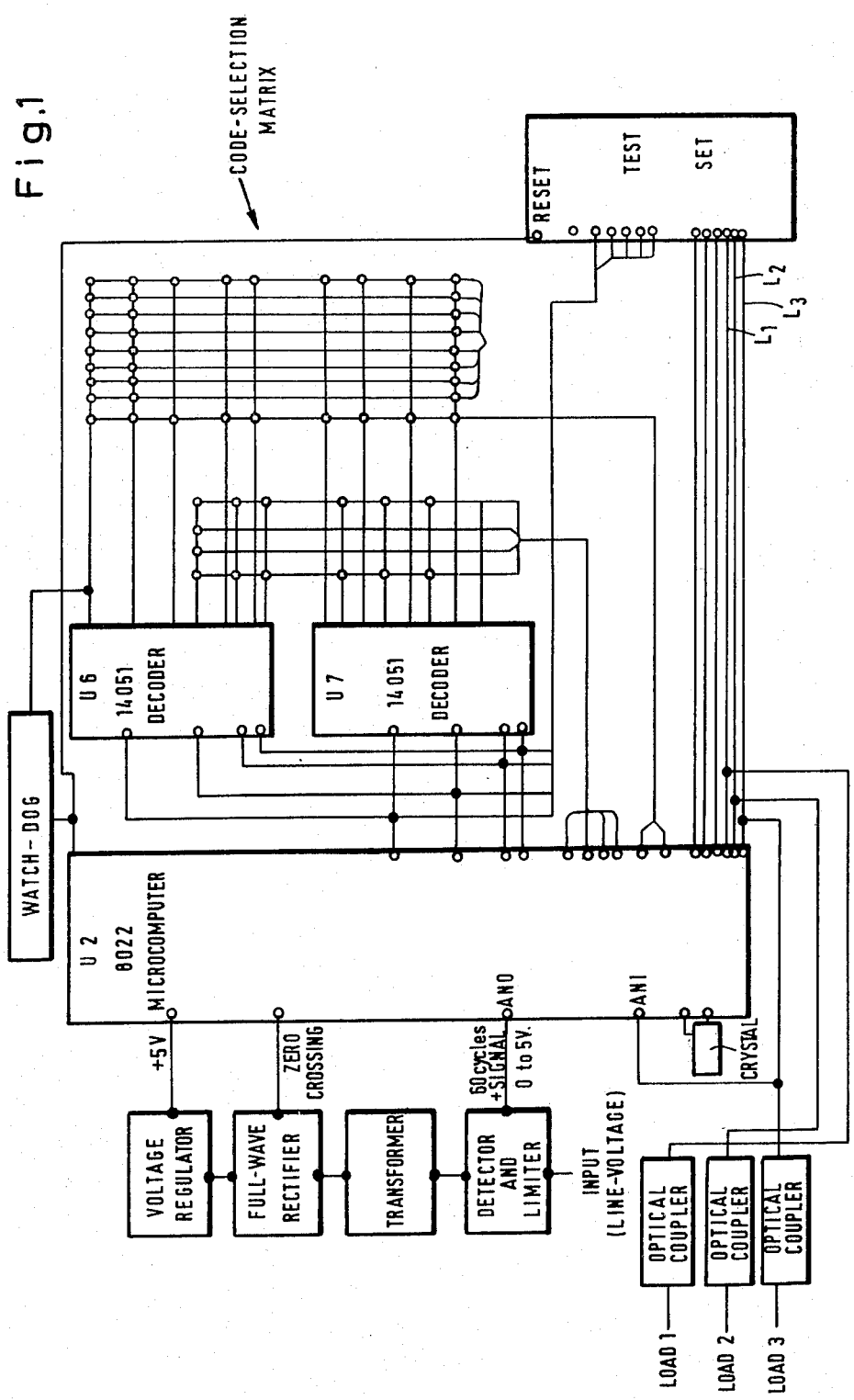
FIG. 1 is a block diagram of the load control receiver constructed in accordance with the invention.
Figure 2:
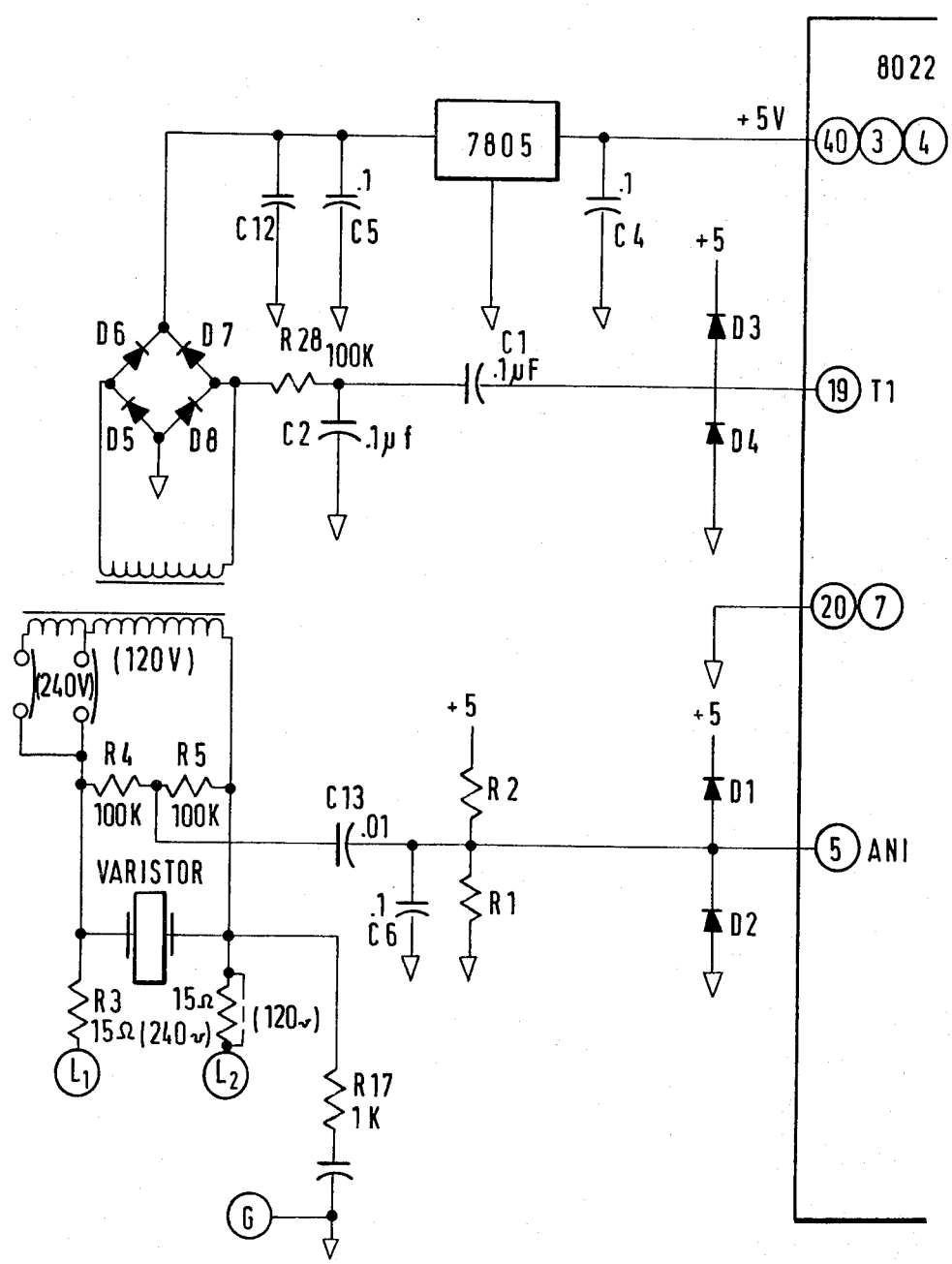
FIGS. 2 through 5 are more detailed circuit diagrams of the various parts of the load control receiver of FIG. 1.
Figure 3:
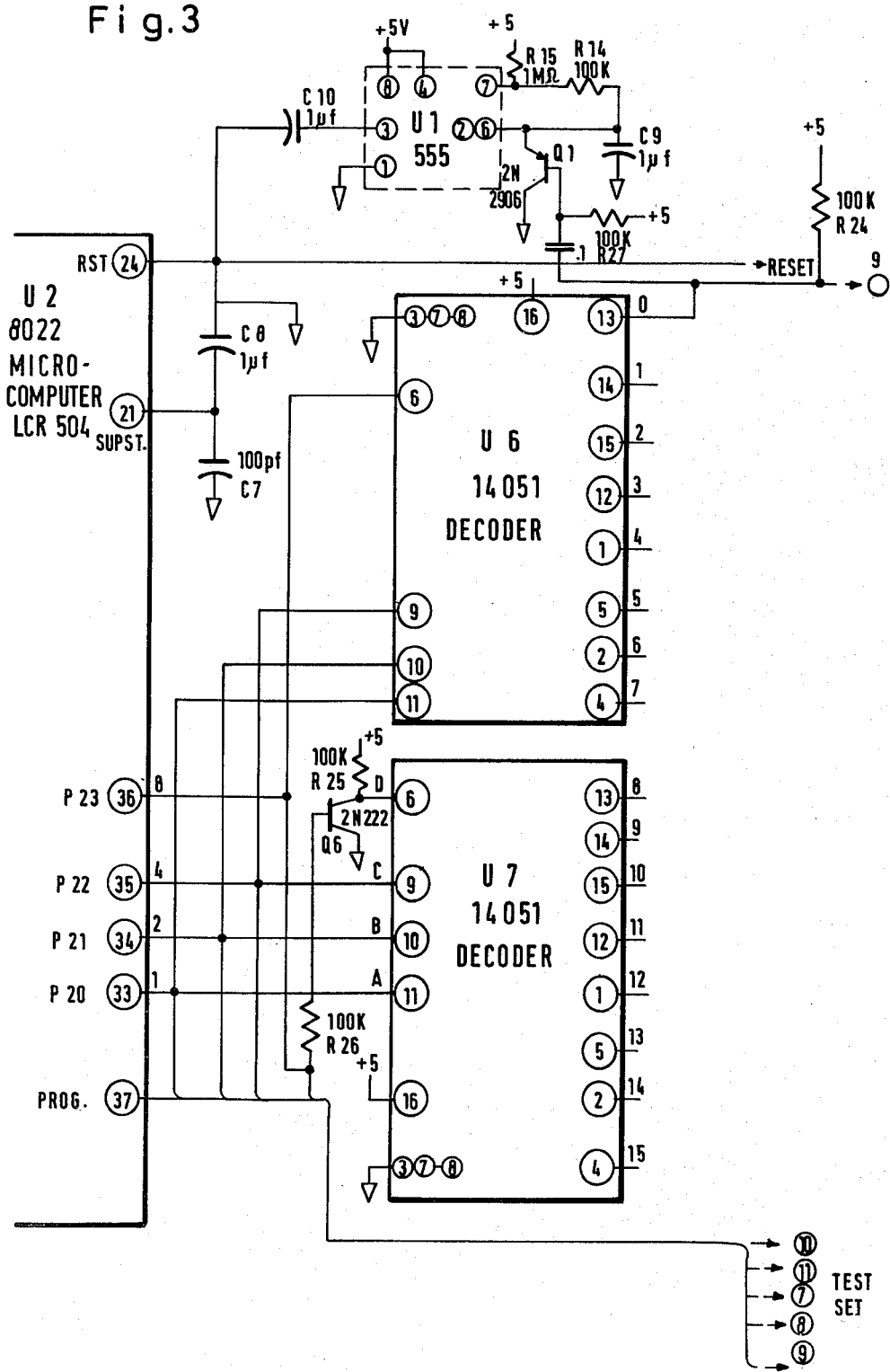
Figure 4:
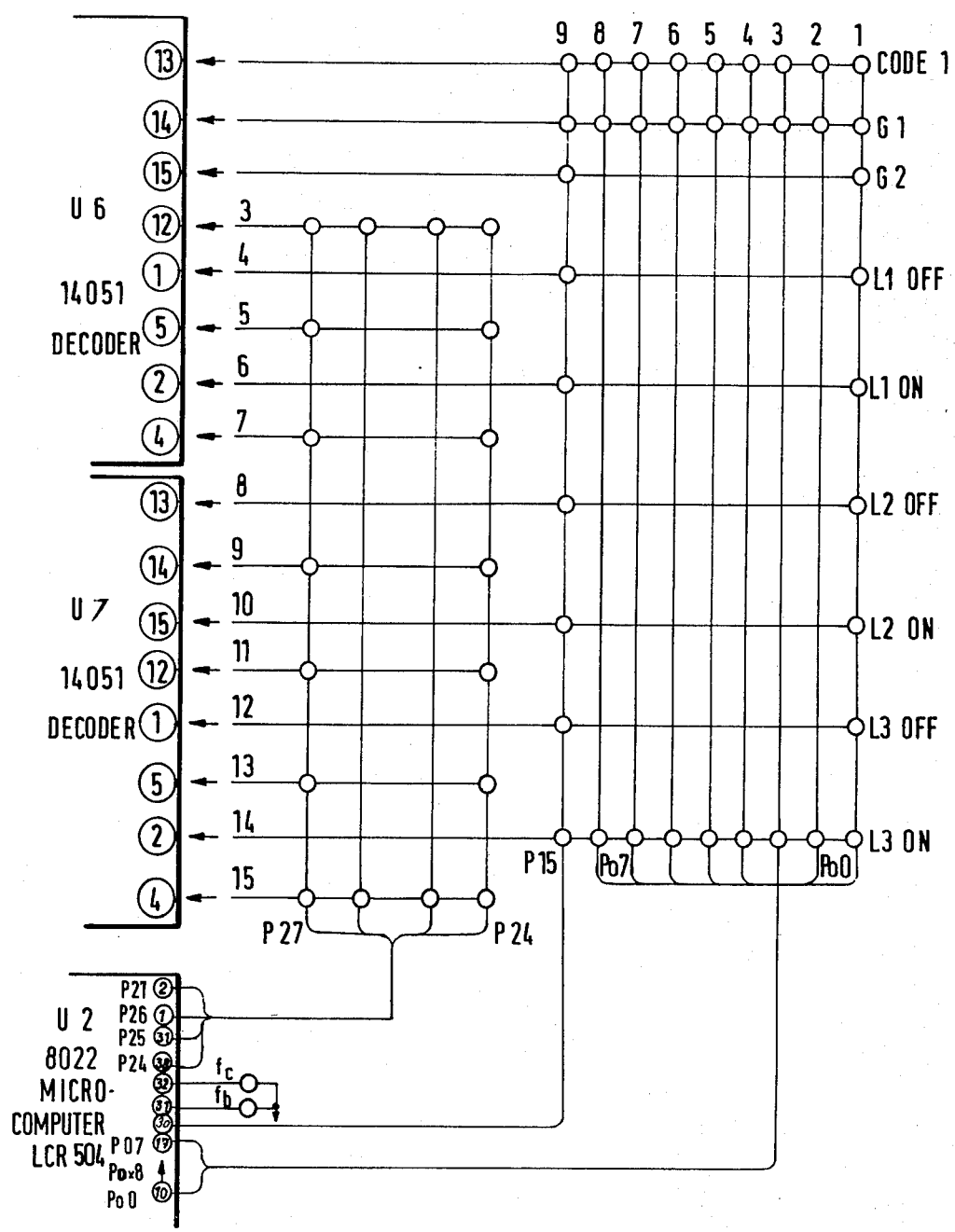

Referring now to the drawings and first, particularly, to FIG. 1 thereof, there is shown a block diagram of the load control receiver according to the invention with an input of a line voltage having a data message for effecting load management superimposed thereon. In a detector and limiter, the signal containing the data message is fed to the pin 5 of an 8022 Intel microcomputer. From the detector, the line voltage is stepped down by a transformer a full wave rectifier from which an input to pin 19 of the 8022 microcomputer is made for obtaining zero-crossing and from which also, through a voltage regulator (Motorola SM 7805), 5 volts are applied to pins 40, 3 and 4 of the microcomputer. The input of the pin 24 of the microcomputer 8022 is connected to a pin 13 of a test set for reset. The outputs of pins 33 to 36 of the microcomputer 8022 are connected to the inputs of pins 6, 9, 10 and 11 of two one-out-of-8 decoders (Motorola MC 14051 B). The outputs of pins 1, 2, 4, 5 and 12 through 15 of the two decoders U6 and U7 are connected in a conventional manner to inputs of a miniature decoding matrix such as is shown and described on pages 7 and 8 of Brochure Number SI 50859 E of Brown, Boveri & Cie AG of Mannheim, Germany, entitled Electronic Ripple Control Receiver REZ, published on or before Mar. 22, 1977. The output of th code-selection matrix 100 is connected to pins 1, 2, 38, 39, as well as 10 and 17 of the microcomputer 8022. A monitoring circuit including a timer circuit NE 555 is connected to the reset line from the pin 24 of the microcomputer 8022, as well as to the code-selection matrix 100. Pins 33 to 37 of the microcomputer 8022 are all connected to each of the pins 7 through 11 of the test set, while pin 8 of the microcomputer 8022 is connected to the pin 12 of the test set. Pins 25 through 29 of the microcomputer 8022 are respectively connected to pins 6, 5, 4, 3 and 2 of the test set. The outputs of pins 27, 26 and 25 are respectively connected to optical couplers (Motorola MOC 3021), three in number in the embodiment illustrated in the instant application, controlling three loads. The optical coupler for the load 3 is also connected to the pin 6 of the microcomputer 8022.

FIGS. 2 through 5 show, in greater detail, the construction of component parts of the circuit which make up the load control receiver of the invention. As will be noted in FIG. 2, the varistor is a General Electric V 250L4.

Figure 5:
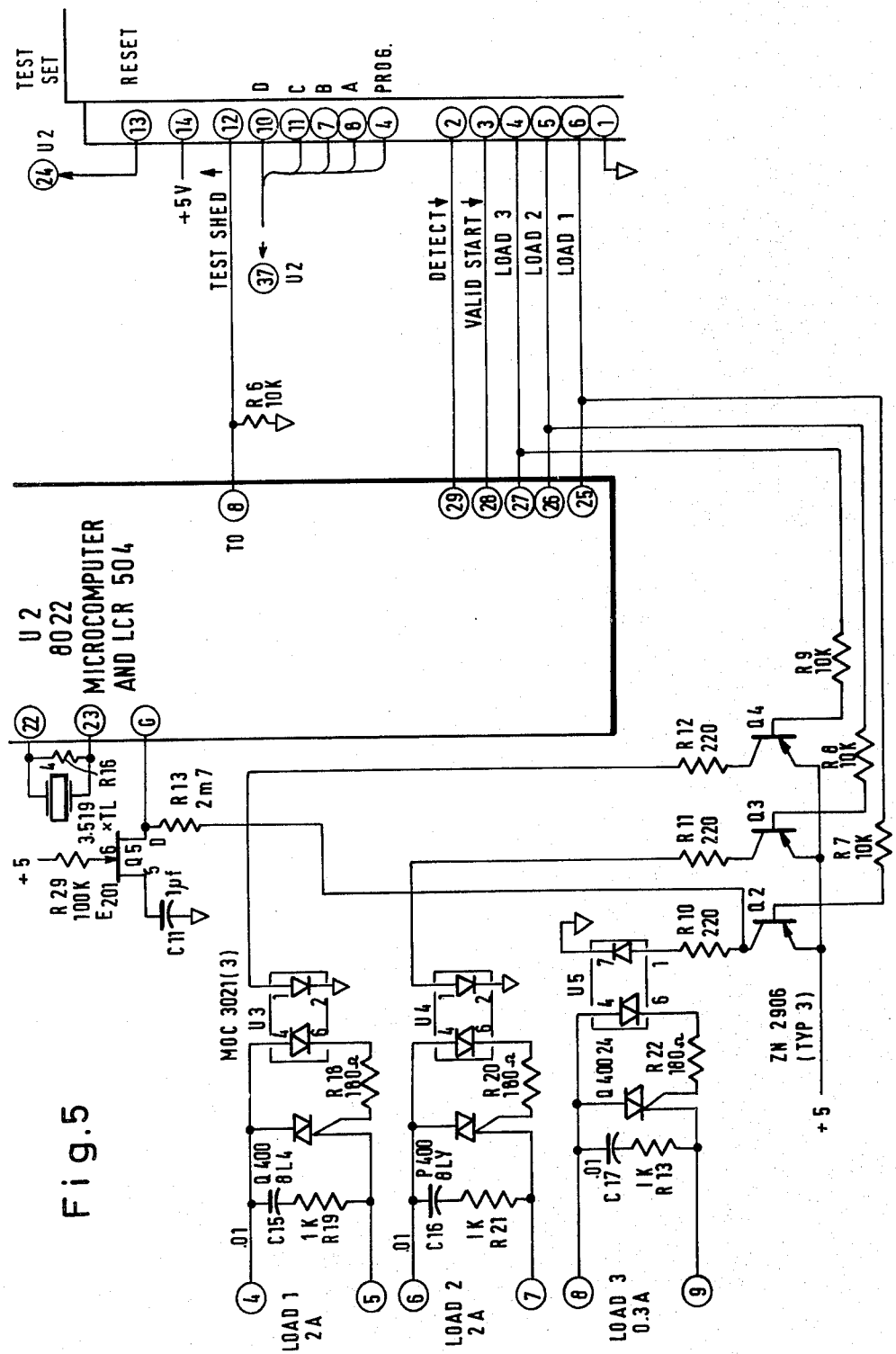

In FIG. 5 there is shown a 3.579 MHz crystal for a timing control connected to the pins 22 and 23 of the microcomputer 8022. Each of the optical couplers MOC 3021 includes Triacs (Teccor Q 400E4, as well as Q 4008L4), as indicated in FIG. 5.

Figure 6:
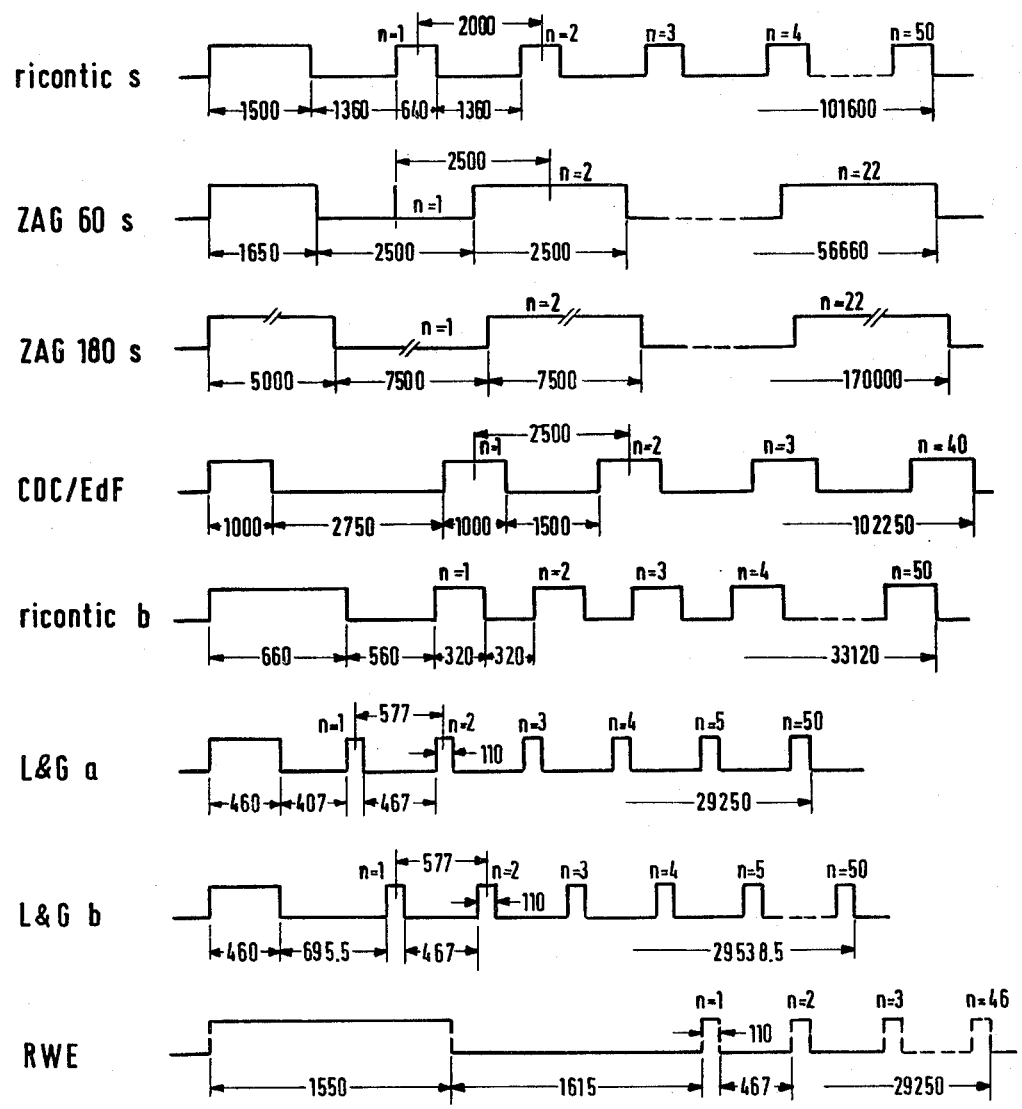
FIG. 6 are wave form diagrams of various conventional data messages superimposed on a line voltage.

In general, the concept of a load control receiver affords means for decoding a signal which has been impressed upon a power line. Generally, this signal assumes the form of on and off pulses in the 200 to 500 Hz range which form data words or messages. A typical data message, a number of which are shown in FIG. 6, is 50 bits long consisting of a space or "off" pulse and a control command "on" pulse (Ricontic S and Ricontic B). The control command pulses are interspersed with the control messages. Various message formats and timings can be employed depending upon the particular equipment. In this regard, referecne is made to page 3 of brochure No. D SI 50859 E of the Brown, Boveri & Cie AG of Mannheim, Germany, entitled Electronic Ripple Control Receiver REZ, published on or before Mar. 22, 1977. The microprocessor U2 of the invention is selected so as to accept any of these messages by using the proper code selection matrix 100.

In general, the microprocessor U2 will look for a start command or impulse of a proper length. The length of this start impulse or bit must be at least 75% correct, otherwise it is not acceptable. The microprocessor U2 will then look for the first "off" or space bit, the length of which must be 50% correct before it is accepted.

Subsequent "off" or space bits and command "on" bits must also be 50% correct before they are accepted.

The command bits are sent in the various time slots. Should the command bits compare to the code selection matrix 100, the loads on the power line will appropriately be turned on or off. It is possible to abort a respective control message by sending an "on" bit where a space should be, as shown in a comparison of a regular command and the Ricontic interruption method according to Brown, Boveri & Cie, as shown in FIG. 7 and as described, for example, on page 6 of the preceding brochure. The microprocessor interprets the receipt of the "on" bit instead of the space as a stop command and aborts the message. When the load control receiver is initially powered up, the line loads are not turned on until 7 minutes ± 2 minutes have elapsed and thereafter in a sequence having one minute intervals therebetween. As a message is sent to the load control receiver and decoded, the receiver may be programmed either to turn the shed load back "on" after a given time delay or to wait for a proper "on" command.

One of the unique features of the load control receiver according to the invention is the ability thereof to detect and decode the various tones or signals without requiring pre-filtering. This detection is effected by taking samples of adjacent 60 Hz wave forms. In the exemplary embodiment of the load control receiver of the invention shown in the drawings and described hereinbefore, 20 samples are taken at 485 microsecond intervals, 4 milliseconds after the sample wave form crosses zero on terminal 19 in the positive direction of the micro-processor U2. In order to operate properly, each of the samples must be taken at exactly the same location on the adjacent wave forms. If an exact 60 cycle frequency is used, it is possible to take a sampling at any portion of the adjacent wave forms based upon time i.e. the sample must nevertheless be located at the same point of each of the adjacent wave forms, those points being accordingly other than the zero crossings of the wave form at the abscissa.

Figure 8:
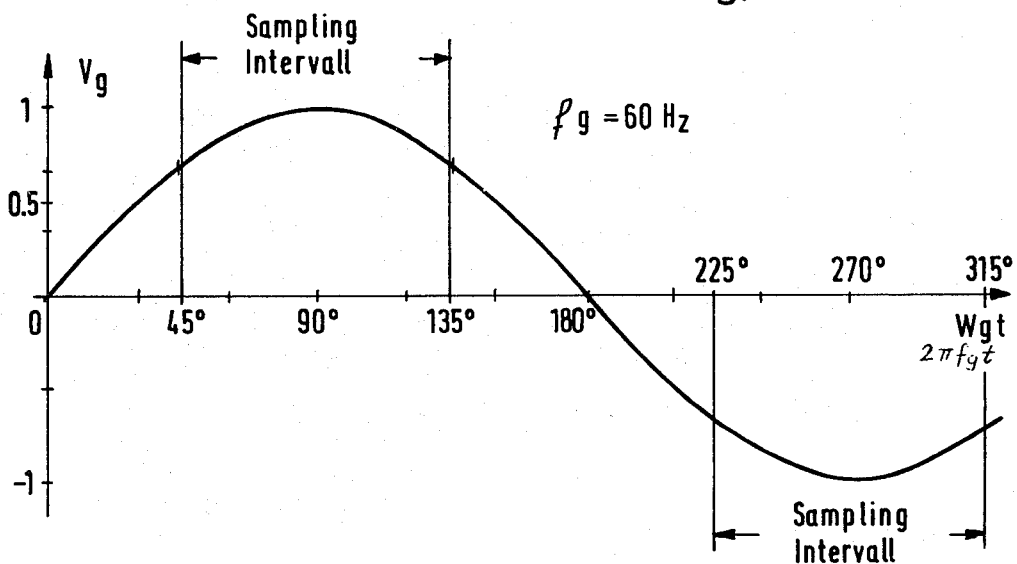
FIG. 8 is a wave diagram of a 60-Hz line voltage showing sampling periods from 45° to 135° el and from 225° to 315° el.

FIG. 8 is a wave diagram of a line voltage Vg having a fundamental frequency fg=60 Hz in a range between 0° and 315° el. The sampling interval is located in one or the other half-wave of the line voltage Vg symmetrically to the maximum value and extends, respectively, between 45° and 135° or between 225° and 315° el.

Figure 9:
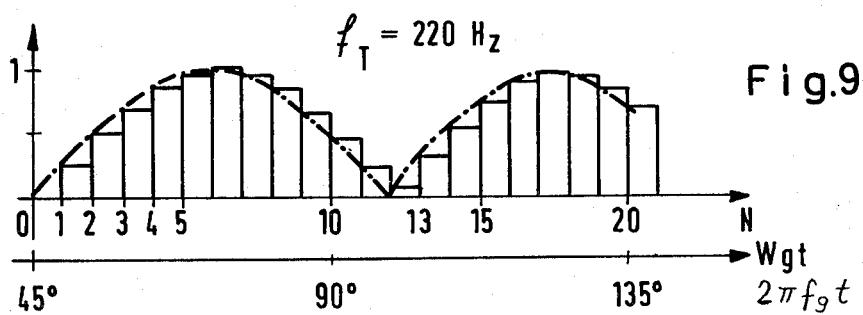
FIGS. 9 and 10 are plot diagrams, respectively, for tone frequencies of 220 Hz and 340 Hz of a number of digital difference values between two sampling sets obtained in the sampling interval of 45° to 135°.

FIG. 9 shows a number N=20 of digital difference or differential values D for a tone frequency $f_T$=220 Hz. The differential values are formed from two sets of samplings (S0,S1) which had been obtained in the sampling interval from 45° to 135°. Minima of the differential values occur at D0 and D12. This spacing or distance differential ΔN is characteristic for the tone frequency $f_T$=220 Hz.

Figure 10:
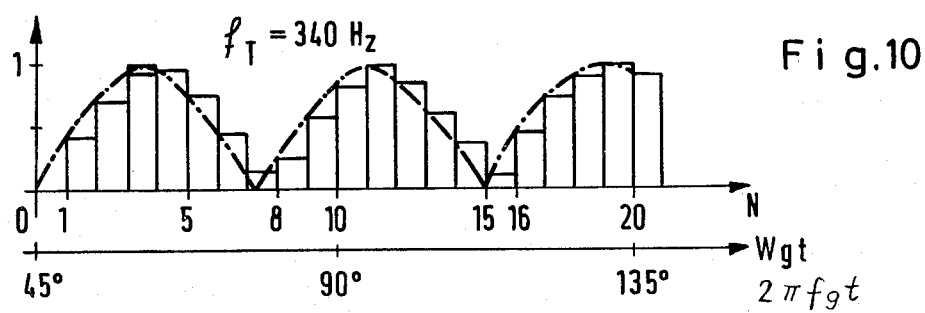
Figure 11:
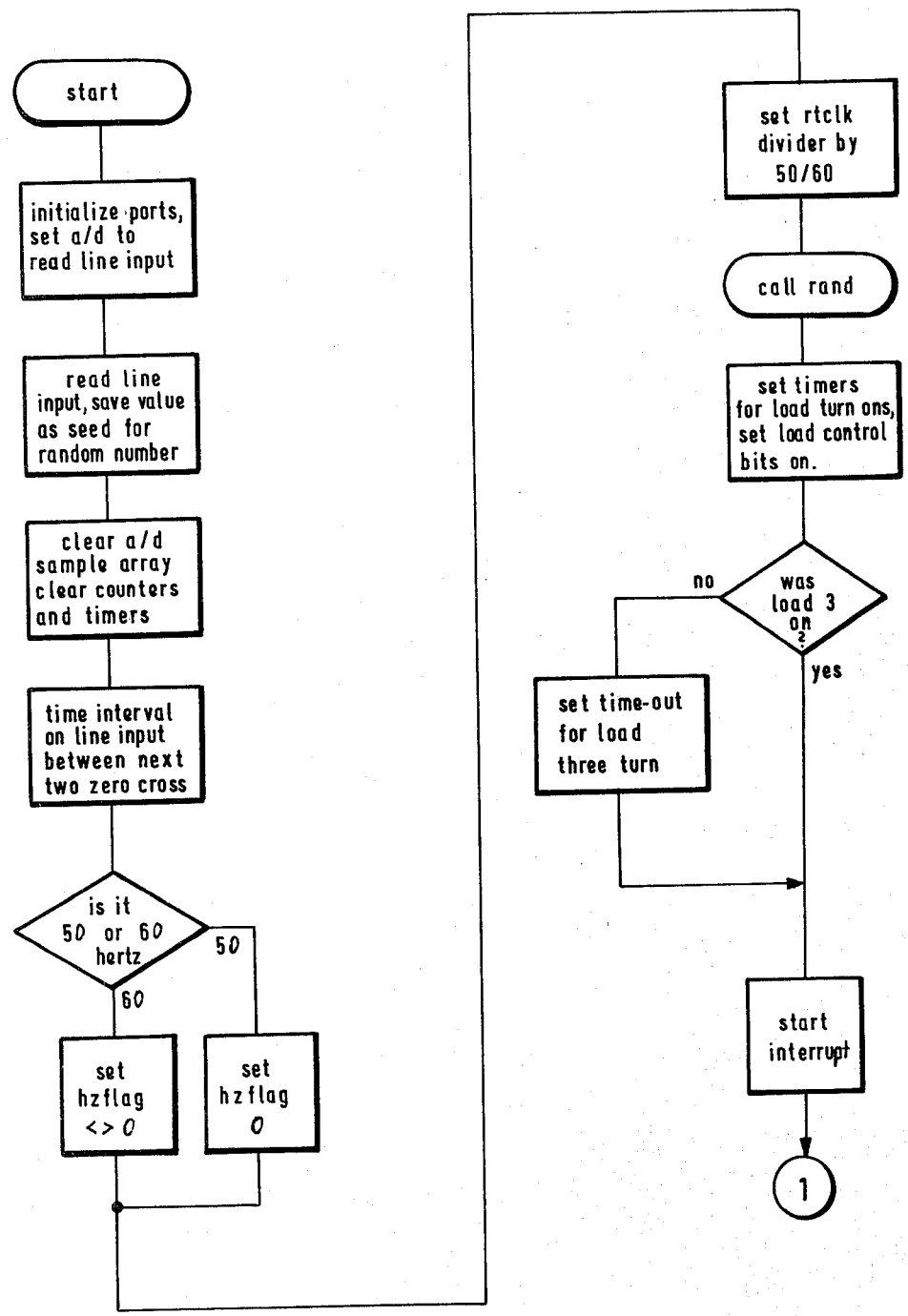
FIGS. 11 to 16 is a block diagram of a computer program for aid in understanding the programming concepts which are applicable to the load control receiver.
Figure 12:
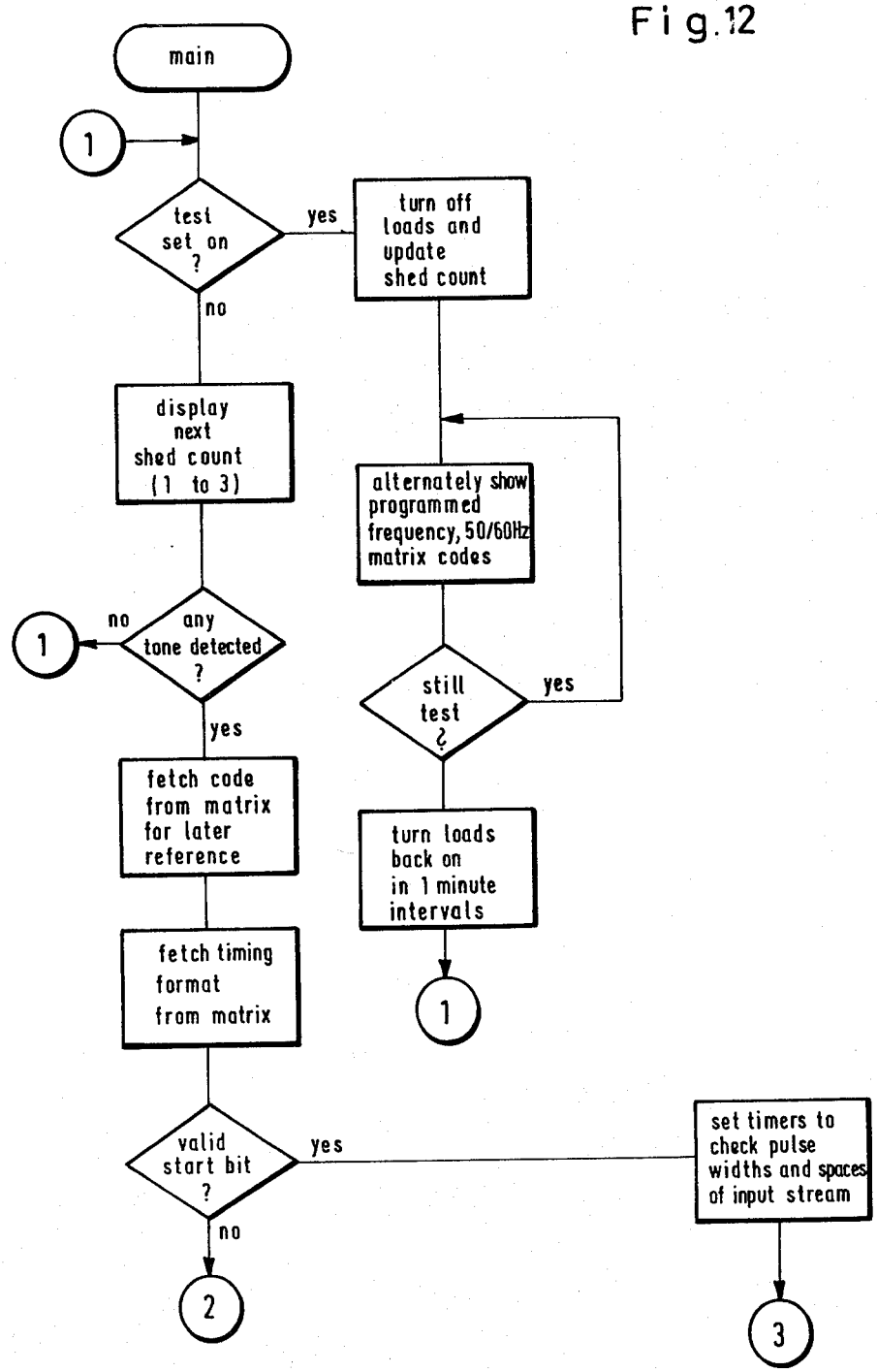
Figure 13:
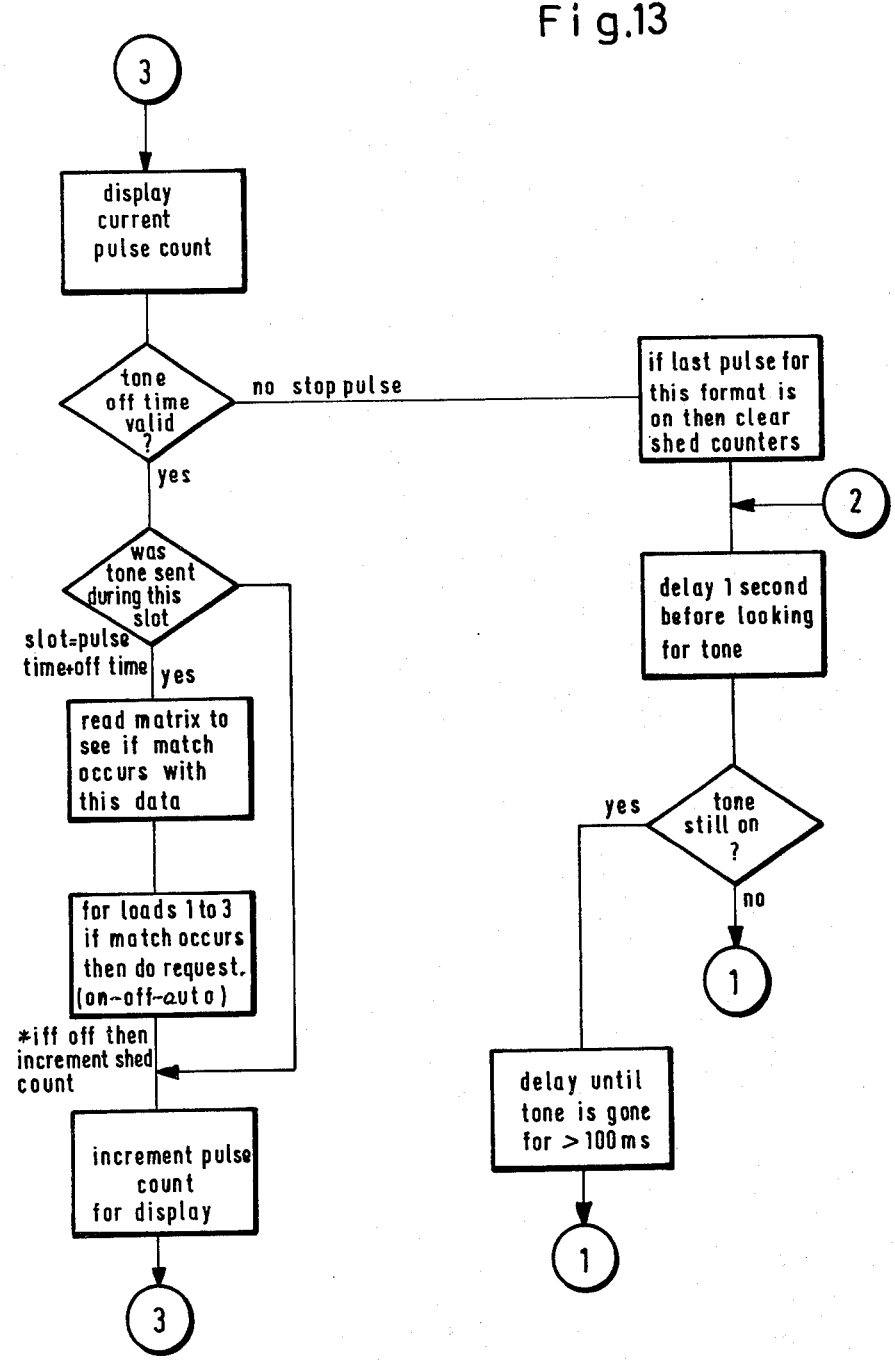
Figure 14:
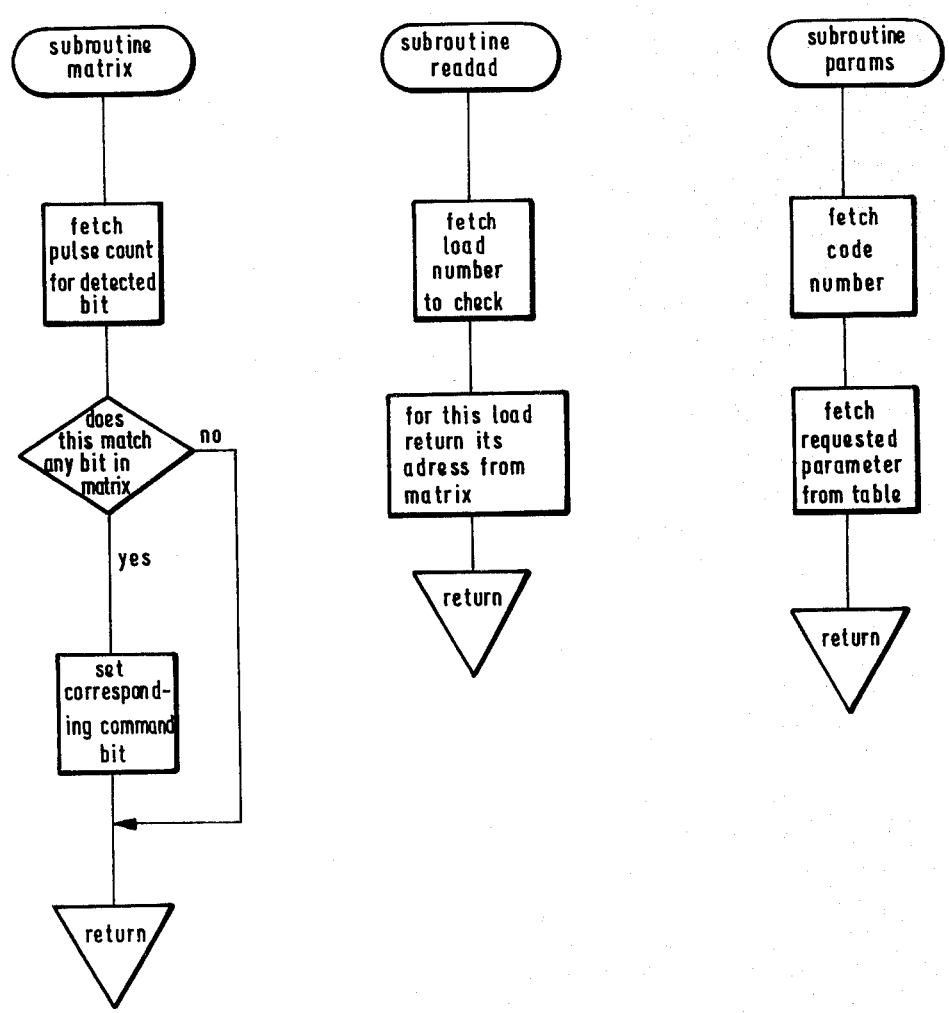
Figure 15:
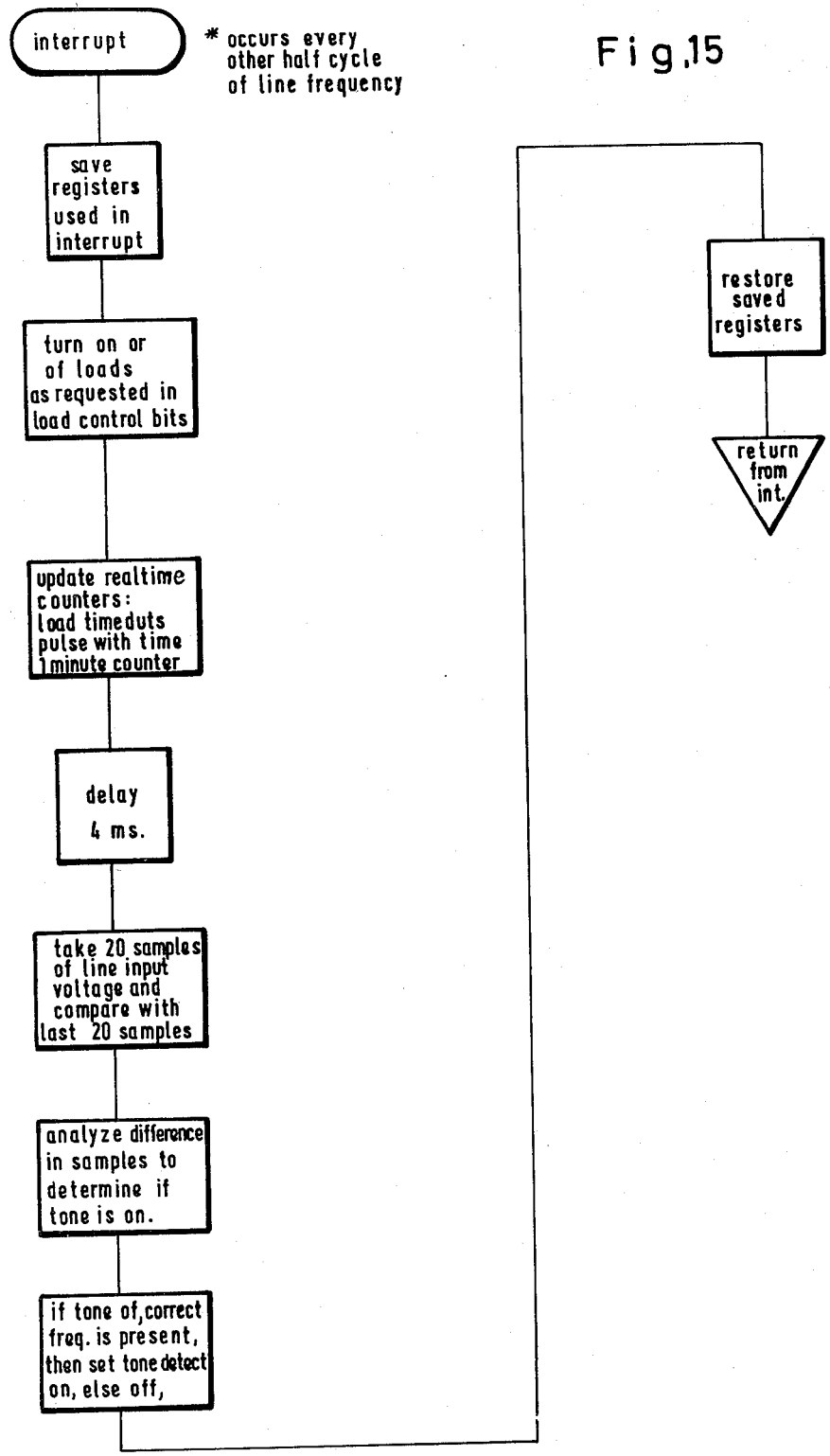
Figure 16:
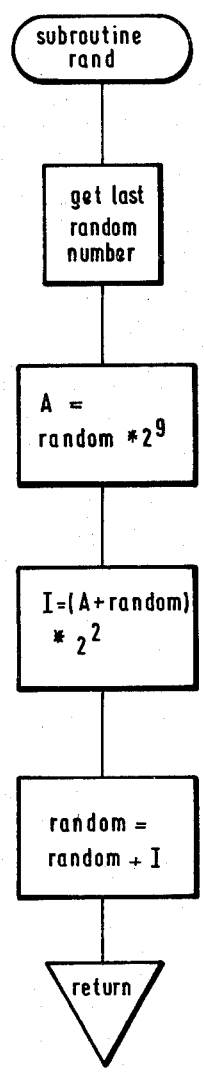

In FIG. 10 there is shown the sampling interval between 45° and 135° for the case of a tone frequency $f_T$=340 Hz. Minima occur at digital differential values D0,D8 and D15. The mean spacing or distance differential ΔN is thus 7.5; this value is characteristic for the tone frequency $f_T$=340 Hz.

The 20 samples are then stored in the microprocessor U2. As each sample is taken at each of th 20 locations, the value thereof is subtracted from the value of the first location. The microprocessor then determines whether this difference is positive-going or negative-going and stores the plus or minus value for each of the 20 locations. It then analyzes the number of samples between transitions. If this number is between 5 and 15, the sample is accepted. If it is greater than 15 or less than 5, it is either noise or no signal and is discarded and an additional sample is taken.

For the four long processed train codes shown in the upper half of FIG. 6, ten good samples are taken with a maximum of 15 per trial. If five bad samples in a row are encoutered, the pulse is said to be off. The total number of counts between zero crossings for the ten samples, is then compared to the Table to determine which frequency is present, for example, each 95 to 120 counts for b 220 Hz. If all of this information checks, the control signal is considered to be present.

The same procedure is used for the four short codes shown in the bottom half of FIG. 6, except that five samples with a maximum of 10 and 5 bad samples are allowed. The microporcessor U2 further analyzes the output pulse as being "on" and "off" for the control period of time to match the selected code word.

If the control commands match the code-selection matrix 100, the appropriate load commands are issued.

FIGS. 11 to 16 is a block diagram of a computer program, provided for aid in understanding the programming concepts which are applicable to the load control receiver of the invention.

There are claimed:

1. Method for detecting the presence or absence of an audiofrequency signal ($V_T$) superimposed on a power supply network, the audio-frequency signal ($V_T$) having a known frequency ($f_T$) and an amplitude ($A_T$) lying within a permissible range of amplitudes ($\Delta A_T$), where the power supply network transmits a signal mixture (V) containing a fundamental ($V_g$, $f_g$, $A_g$), harmonic frequencies ($V_H$, $f_H$, $A_H$) thereof and interference frequencies ($V_S$, $f_S$, $A_S$), which comprises, with a microcomputer ($M_C$), generating a signal at the same point on adjacent waves of the fundamental ($V_g$);

after the occurrence of a first generated signal (ZCS 1), taking with an A/D-converter (ADC), at equal time intervals ($\Delta t$), a given number (N) of samples (S0) of the voltage (V) on the power supply network, and storing the digital amplitude widths thereof (S0.1, S0.2, ... S0.N) in a read-write memory (RAM);

after the occurrence of a further generated signal (ZCS 2), taking a further equal number (N) of samples (S1);

forming a digital difference (D) of respective amplitude values (S0.1, S1.1) of the two samples (S0, S1);

likewise storing the digital difference values (D1, ... DN);

as a first criterion, checking the digital difference values (D1 ... DN) as to whether they are within a range of difference values (ΔD) which corresponds to the permissible range of amplitudes ($\Delta A_T$) of the radio-frequency signal ($V_T$);

detemining minimum values ($D_{min}$) of the digital difference values (D1 ... DN);

determinng a spacing difference (ΔN) beteen two successive minima ($D_{min}$);

as a second criterion, checking the spacing difference (ΔN) as to whether it corresponds to the spacing of two successive points of the audio-frequency signal ($V_T$) at which the generated signal is generated; and generating a "present" signal (ES) in the microcomputer when both criteria are met.

2. Method according to claim 1 wherein the generated signal is a zero crossing signal (ZCS) generated by a zero crossing detector (ZCD) at each zero crossing of the fundamental ($V_g$).

3. Method according to claim 1 which includes comparing basically all of the actual samples ($S_x$) with preceding samples ($S_{x-1}$) stored in the write-read memory (RAM), actualizing the values in the write-read memory (RAM) after the comparison and clearing of the old values ($S_{x-1}$).

4. Method according to claim 1 wherein the spacing difference (ΔN) is determined over a plurality of samples as a criterion of frequency selection.

5. Method according to claim 1 which includes taking the samples (S0, S1 ... Sx) only in a defined angular range (α), referred to the period of the fundamental ($V_g$).

6. Method according to claim 5 which includes taking the samples (S0, S1 ... SX) in an angular range (α) about the amplitude maxima of the fundamental ($V_g$).

7. Method according to claim 5 which includes taking the samples (S0, S1 ... SX) in an angular range (α) of the fundamental period of 45° to 135°.

8. Method according to claim 1 which includes rectifying the signal mixture (V) on the power supply network before it is fed to the A/D converter (ADC).

9. Method according to claim 5 which includes reducing the amplitude ($A_g$) of the fundamental ($V_g$) before the signal mixture (V) is fed to the A/D converter (ADC).

10. Method according to claim 9, which includes feeding only the crests of the fundamental ($V_g$) to the A/D converter (ADC).

11. Method according to claim 9 which includes reducing the amplitude ($A_g$) of the fundamental ($V_g$) in a frequency-selective manner.

12. Method according to claim 1 which includes storing only the absolute values of the digital difference values (D1 ... DN) in the write-read memory.

13. Method according to claim 1, which includes, as a third criterion, checking the digital difference values (D1 ... DN) as to whether they correspond to a sine function; and generating the "present" signal (ES) in the microcomputer (MC) only if all three criteria are met.

14. Method according to claim 1 which includes reconverting the digital difference values (D1 ... DN) into the analog audio-frequency signal ($V_T$) by means of a digital-analog converter (DAC).

15. In a system for detecting the presence or absence of an audio-frequency signal ($V_T$) superimposed on a power supply network, the audio-frequency signal ($V_T$) having a known frequency ($f_T$) and an amplitude ($A_T$) lying within a permissible range of amplitudes ($\Delta A_T$), where the power supply network transmits a signal mixture (V) containing a fundamental ($V_g$, $f_g$, $A_g$), harmonics ($V_H$, $f_H$, $A_H$) thereof and interference frequencies ($V_S$, $f_S$, $A_S$), the improvement therein comprising a microcomputer having means operatively associated therewith for generating a signal at the same point on adjacent waves of the fundamental ($V_g$);

an analog/digital converter (ADC) for taking, at equal time intervals ($\Delta t$), after the occurrence of a first generated signal (ZCS 1), a given number (N) of samples (SO) of the voltage (V) on the power supply network, a read-write memory (RAM) connected to said converter (ADC) for storing digital amplitude widths (S0.1, S0.2, ... S0.N) of the samples (S0) in said converter (ADC), said memory (RAM), after occurrence of a further generated signal (ZCS2), being actuatable for taking a further equal number (N) of samples (S1);

means for forming a digital difference (D) of the two samples (S0, S1);

said memory (RAM) being actuatable for likewise storing the digital difference values (D1, ... DN);

means for checking a first criterion as to whether the digital difference values (D1, ... DN) are within a range of difference values ($\Delta D$) which corresponds to the permissible range of amplitudes ($\Delta A_T$) of the audio-frequency signal ($V_T$);

means for determining minimum values ($D_{min}$) of the digital difference values (D1 ... DN);

means for determining a spacing difference ($\Delta N$) between two successive minima ($D_{min}$);

means for checking a second criterion as to whether the spacing difference ($\Delta N$) corresponds to the spacing of two successive points of the audio-frequency signal ($V_T$) at which the generated signal is generated; and means for generating a "present" signal (ES) in said microcomputer when both said criteria are met.

16. System according to claim 15 wherein said means for generating said signal is a zero crossing detector (ZCD), and said generated signal is a zero crossing signal (ZCS) generated at each zero crossing of the fundamental ($V_g$).

17. System according to claim 15 including means for comparing all further samples ($S_2$, $S_3$ ... $S_x$) with the first sample (S0) stored in said read-write memory (RAM) when said "present" signal (ES) is present.

18. System according to claim 15 including means for rectifying the signal mixture (V) on the power supply network before it is fed to the analog/digital converter (ADC).

19. System according to claim 18 including means for reducing the amplitude ($A_g$) of the fundamental ($V_g$) before the signal mixture (V) is fed to the analog/digital converter (ADC).

20. System according to claim 19 including means for feeding only the crests of the fundamental ($V_g$) to the analog/digital converter (ADC).

21. System according to claim 15 wherein said read-write memory (RAM) for storing the digital difference values is for storing only the absolute values thereof.

22. System according to claim 15 including means for checking a third criterion as to whether the digital difference values (D1, ... DN) correspond to a sine function, said "present" signal generating means being actuatable only if all three criteria are met.

23. System according to claim 15 including a digital-/analog converter (DAC) for reconverting the digital difference values (D1, ... DN) into the analog audio-frequency signal ($V_T$).

24. Method according to claim 13 which includes, as a fourth criterion, checking if at least half (Y/2) of a given number (Y) of sequential samples ($S_{x-y}$, $S_{x-y+1}$ ... $S_x$) fulfill at least the first and second of said first, second and third criteria; and generating the "present" signal (ES) in the microcomputer (MC) only if the fourth critarion is fulfilled.

* * * * *